(12) United States Patent
Hidding et al.

(10) Patent No.: US 8,132,498 B2
(45) Date of Patent: Mar. 13, 2012

(54) APPLIANCE FOR MAKING COFFEE, TEA AND THE LIKE

(75) Inventors: Elze Deodaat Hidding, Hoogeveen (NL); Vincent Bernardus Hubertus Ten Horn, Leiden (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 418 days.

(21) Appl. No.: 12/443,873

(22) PCT Filed: Oct. 2, 2007

(86) PCT No.: PCT/IB2007/053998
§ 371 (c)(1),
(2), (4) Date: Apr. 1, 2009

(87) PCT Pub. No.: WO2008/041180
PCT Pub. Date: Apr. 10, 2008

(65) Prior Publication Data
US 2010/0116141 A1 May 13, 2010

(30) Foreign Application Priority Data
Oct. 6, 2006 (EP) .................................. 06121878

(51) Int. Cl.
*A47J 31/40* (2006.01)
*A47J 31/06* (2006.01)
*A47J 31/44* (2006.01)

(52) U.S. Cl. .............................. 99/283; 99/299; 99/285
(58) Field of Classification Search ............ 99/279–283, 99/285, 289 R, 299, 320
See application file for complete search history.

(56) References Cited

U.S. PATENT DOCUMENTS

| | | | |
|---|---|---|---|
| 3,348,468 A * | 10/1967 | Eisendrath | ...................... 99/282 |
| 4,055,114 A | 10/1977 | Kats et al. | |
| 4,713,526 A | 12/1987 | Smit | |
| 5,778,764 A | 7/1998 | Nielsen | |
| 6,067,894 A * | 5/2000 | Eugster | ........................... 99/285 |
| 6,305,268 B1 * | 10/2001 | Schamberg et al. | ............ 99/283 |

FOREIGN PATENT DOCUMENTS

| | | |
|---|---|---|
| DE | 29800175 U1 | 5/1998 |
| EP | 0922425 A1 | 6/1996 |
| EP | 1166696 A1 | 1/2002 |

* cited by examiner

*Primary Examiner* — Mark Graham

(57) ABSTRACT

An appliance for making coffee, tea and the like comprises an automatic adjustment unit (22) for adjusting the desired quantity ratio between the quantity of water in a water reservoir (2) and the quantity of substance in a filter holder (4). The adjustment unit (22) can adjust the loadable length of a resilient element (50*a*) in response to the level of the water in the reservoir 2. The resilient element (50*a*) is pivotally attached to a lever (5) of the filtering system (3). The rotation of the lever (5) is indicated on a strength indicating scale (10, 11, 12).

6 Claims, 3 Drawing Sheets

APPLIANCE FOR MAKING COFFEE, TEA AND THE LIKE

The invention relates to an appliance for making coffee, tea and the like, comprising a housing, a water reservoir and a filtering device.

An appliance for making coffee and the like is known from U.S. Pat. No. 4,055,114. In order to obtain a good result the ratio between the amounts of water and the substance to be filtered is important. In U.S. Pat. No. 4,055,114 devices are disclosed which aim at a manner of brewing coffee and the like, in which the correct amount of substance to be filtered can be determined for any amount of water. Thereto, one of the devices of U.S. Pat. No. 4,055,114 includes a housing, a water reservoir fixed relative to the housing, a movable element, in the form of a float, responsive to the water level in the water reservoir, a lever and a filtering device. An end portion of the lever is rotatably connected to the housing in a first pivot. The filtering device is rotatably suspended from the lever in a second pivot by means of bearing cams. The float is connected to the lever via a rod. The rod is rotatably attached to the lever in a third pivot. The lever, the float and the filtering device constitute a lever mechanism having a leverage ratio defined by the ratio of the distance between the first and the second pivot and the distance between the first and the third pivot. The end of the lever near the third pivot carries a pointer to indicate the position of the lever relative to the housing. Thereto, a corresponding index mark is provided to the housing. The position of the second pivot relative to the first and third pivot is adjustable. For this reason the leverage ratio of the lever mechanism is adjustable.

Depending on the desired amount of brew the water reservoir is filled to a level. The level is for example visible on a vertical scale on a wall of the reservoir. According to U.S. Pat. No. 4,055,114 the float is lifted by the water in the reservoir to a position in which the pointer is above the index mark. By for example pouring ground coffee into the filter holder, the lever can be returned until the pointer is at a reference mark of the index mark. The lever mechanism has been proportioned such that in this position of the lever and the pointer, a constant ratio is obtained between the amount of water in the water reservoir and the amount of ground coffee in the filter holder for any water level between a minimum and a maximum level in the reservoir. By manually changing or adjusting the leverage ratio the mechanism enables the preparation of a weaker or a stronger brew. An alternative way of working is mentioned, viz. to use the pointer as an indicating means for the strength of the brew.

However, manual adjustment of the leverage ratio requires an additional operation on top of the dosing process of making coffee or the like. The positions, where the manual adjustment may be provided with means for adjustment of the leverage ratio, are confined to the vicinity of the lever. These possible positions are not necessarily close to the pointer and the index mark. For this reason, the pointer and the index mark on the one hand and the manual adjustment of the leverage ratio on the other hand may not be observed at a single glance.

It is an object of the invention to provide an appliance for making coffee, tea and the like of the kind set forth in the opening paragraph, which provides extended ease of operation in the dosing process of making coffee, tea and the like.

According to the invention this object is realized by an appliance for making coffee, tea and the like, comprising a housing for a water reservoir, a filtering device including a filter holder and a lever supported by the housing and supporting the filter holder, and a strength control system for obtaining and indicating a desired quantity ratio between a quantity of water in the water reservoir and a quantity of substance, to be filtered, in the filter holder and for exerting a force on the lever, the strength control system comprising an automatic adjustment unit for adjusting the desired quantity ratio between the quantity of water in the water reservoir and the quantity of substance in the filter holder.

By providing an automatic adjustment unit to the strength control system for adjusting the desired quantity ratio between the quantity of water in the water reservoir and the quantity of substance in the filter holder, a manual adjustment of the leverage ratio to alter the desired strength of the brew can be omitted. If the quantity of water increases the corresponding quantity of substance to be filtered should change substantially proportional to the increased quantity of the water to obtain a brew of equal strength. To obtain a stronger brew, the quantity of substance to be filtered should change more than proportionally with the increased quantity of the water. By adjustment of the desired quantity ratio between the quantity of water in the water reservoir and the quantity of substance in the filter holder, a brew of the desired strength can be obtained, irregardless of the quantity of the brew. To obtain an arbitrary quantity of brew of a reproducible desired strength it is advantageous to adjust the ratio between the quantity of water in the water reservoir and the quantity of substance in the filter holder. Automation of said ratio adjustment provides extended ease of use in the process of making coffee, tea and the like.

By using an automatic adjustment unit, means for manual adjustment of the leverage mechanism may be omitted. This brings the additional advantage of a leverage mechanism that comprises less components and that may be designed with more freedom in positioning further lever components. Furthermore such a mechanism is relatively easy to manufacture.

A further advantage relates to the perceived quality of the brew. To explain this advantage, the mechanics behind the device of U.S. Pat. No. 4,055,114 is analyzed. Depending on the desired amount of brew, the water reservoir of a device of U.S. Pat. No. 4,055,114 is filled to a level which level is for example visible on a visible scale on the wall of the reservoir. A buoyancy force resulting from the immersion of the float into the water is exerted from the water to the float. The buoyancy force is transmitted to the lever via the third pivot and tends to rotate the lever around the first pivot in a first rotation direction. By dosing a quantity of substance to be filtered into the filtering device the lever is loaded in the second pivot by the weight of the substance to be filtered, said weight being transmitted via the filtering device. The weight of the substance to be filtered tends to rotate the lever in a second rotation direction. The second rotation direction is opposite to the first rotation direction as induced by the buoyancy force. The position of the pointer relative to the index mark specifies the rotation of the lever resulting from the buoyancy force on the one hand and the weight of the substance to be filtered on the other hand. It is stated in U.S. Pat. No. 4,055,114 that it is possible to use the pointer as an indicating means for the strength of the brew. The lever mechanism has been proportioned such that in a balanced reference position of the lever a constant ratio is obtained between the amount of water in the water reservoir and e.g. the amount of ground coffee in the filter holder for any water level between a minimum and a maximum level in the reservoir. The pointer is than at the reference mark of the index mark. A constant ratio of these amounts, which proves to be satisfactory in practice, is for example: six grams of coffee per hundred milliliters of water.

If only a slightly weaker or slightly stronger brew is desired, it is possible to use the position of the pointer for indication adjustment of the strength on the index mark. By adding some extra substance to be filtered, the lever and the pointer will not remain in their balanced reference position but will revolve past the reference mark on the index scale in the second rotation direction. The pointer will specify a different position on one side of the reference mark, according to the second rotation direction and representing a stronger brew. By removing some extra substance to be filtered, the mechanism is reversed and the pointer will be on the other side of the reference mark. This new position relative to the reference mark on the index mark should however not be interpreted as the indication of the absolute strength of the brew on a strength indication scale. If the index mark is used as a strength indication scale, it is perceived, that a unit distance on the index scale represents a strength increase of the brew that is dependent on the quantity of the water in the water reservoir and on the leverage ratio adjustment. For this reason, the user should be experienced in interpreting the position of the pointer relative to the reference mark on the index mark to obtain a brew of predictable and desired strength and differing from reference strength. To understand this difference in perception it is assumed, that the lever is balanced and the pointer is at the reference mark. The float is immersed into a quantity of water over an immersion distance corresponding to the reference rotation of the lever and the quantity of water in the reservoir. If an extra quantity of substance to be filtered is added to the filtering system, an extra torque is exerted on the lever by the filtering. The lever rotates and the float is immersed deeper into the water. This process proceeds until the additional torque exerted on the lever by the weight of the extra substance is in equilibrium with the increased torque exerted on the lever by the increased buoyancy force exerted by the water on the float. The increase in buoyancy force is dependent of the quantity of substance to be filtered and independent of the quantity of water in the water reservoir. For this reason, the additional rotation of the lever and the pointer relative to its reference mark is determined by the weight of the substance to be filtered that was extra added to the reference quantity and not by the quantity of water. For this reason, the extra-added substance may be used to strengthen a small or a large quantity of brew at the same position of the pointer relative to the index mark. By providing the automatic adjusting unit to the strength control system, the system indicating the quantity of substance to be added, can be adapted corresponding to the quantity of water in the water reservoir to obtain a strength change of the brew independent of the quantity of water in the water reservoir. With the appliance of the invention, the position of the indicator, relative to the index scale, may be used as a strength marking scale possibly comprising a division in strength units. Such a strength unit represents a perceived strength increase that is independent of the quantity of the water in the water reservoir used for the making of the brew.

An advantageous embodiment of the appliance according to the invention is defined in that the automatic adjustment unit comprises a resilient element having a first part being connected to a portion of the lever and being restricted in a second part at a restriction position responsive to the quantity of water in the reservoir. The first part of the resilient element is connected to the lever while the second part is restricted at a position relative to the quantity of the water in the reservoir. For this reason, the elastic deformation of the resilient element depends on the quantity of water in the reservoir and the rotation of the lever. In deformed state, the resilient element is capable of exerting a force on its environment, dependent on the degree of deformation. For this reason the resilient element influences the equilibrium of the lever, dependent on the quantity of water in the reservoir.

An advantageous embodiment of the appliance according to the invention is defined in that the resilient element is a leaf spring having a loadable portion of adjustable length, said length being adjustable by an adjusting portion of a length control unit included by the automatic adjustment unit. The leaf spring may be dimensioned relatively easy and provides a simple and reliable means of resilience. The leaf spring has a shape that is suitable to cooperate with an adjustably restricting element. For this reason, the compliance of the loadable portion of the leaf spring can be adjusted relatively easy.

An advantageous embodiment of the appliance according to the invention is defined in that the automatic adjustment unit comprises a floatable body, having a position responsive to the quantity of water in the reservoir, for cooperation with a guided portion of the length control unit, the guided portion being coupled to the adjusting portion of the length controller. While making coffee, tea or the like water will be provided to the apparatus. The floatable body in communication with the water in the water reservoir is a reliable way of detecting the water level. The position of the water level and the floatable body may be transmitted to the guided portion of a length control unit. For this reason, relatively few yet reliable components are needed to constitute the adjustment unit. Sensing the water level by the floatable body enables the use of a vast category of materials, having favorable properties for design and manufacture of the floatable body.

An advantageous embodiment of the appliance according to the invention is defined in that the guided portion has a first guide face and the floatable body has a second guide face corresponding to and cooperating with the first guide face for slideable engagement of the floatable body with the guided portion. A sliding contact is a simple means to transmit the position of the floatable body to the length control unit. No extra components are needed as an interface between the floatable element and the length control unit.

These and other aspects of the appliance according to the invention will be exemplarily elucidated and described with reference to the drawings, in which.

Figure 1:
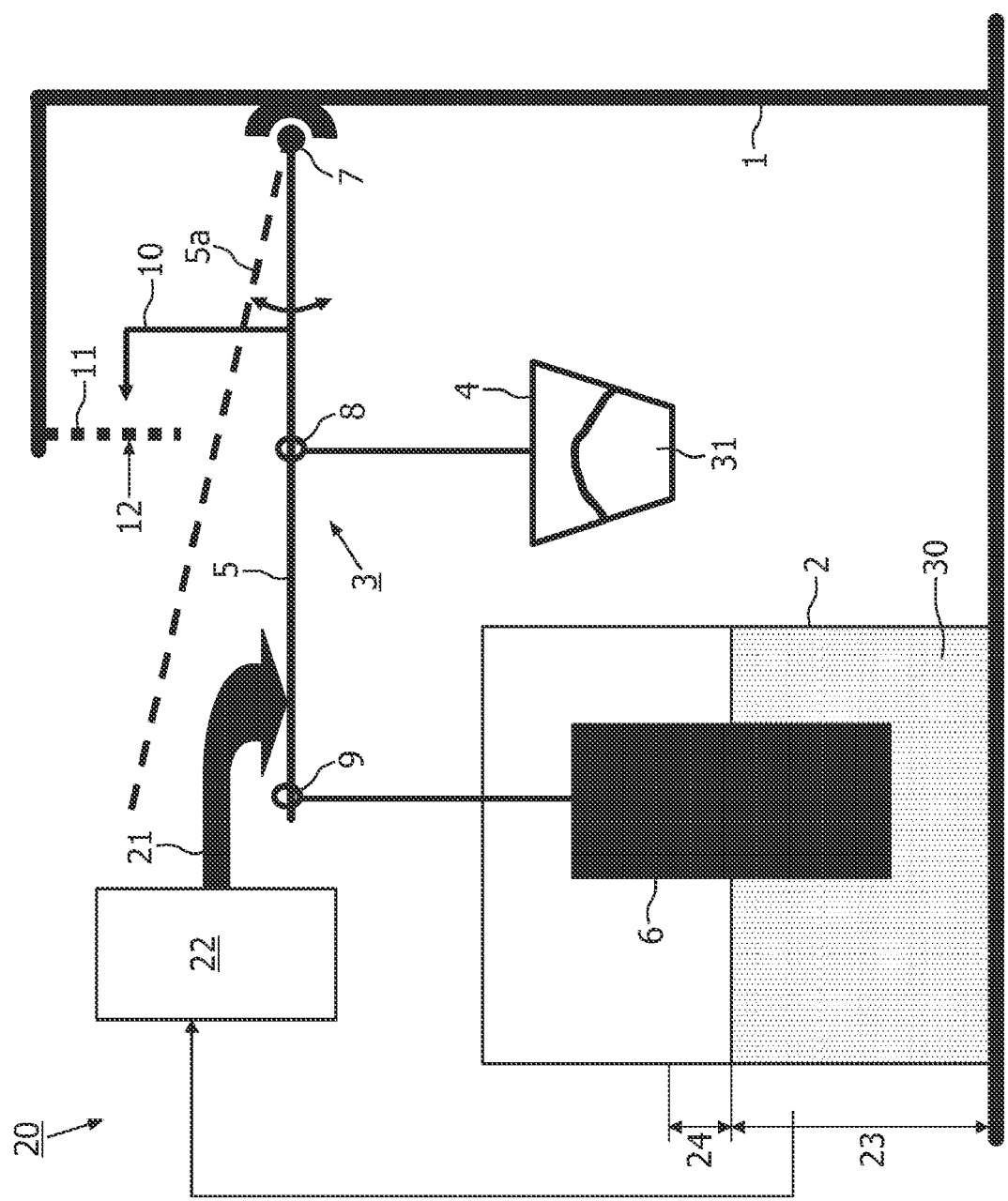
FIG. 1 is a schematic representation of an embodiment of the appliance according to the invention.

In FIG. 1 an embodiment of the appliance for making coffee, tea and the like, according to the invention is schematically depicted. The embodiment according to FIG. 1 comprises a housing 1 for a water reservoir 2, a filtering device 3 including a lever 5 rotatably mounted to the housing 1 and supporting the filter holder 4 containing a quantity of substance 31 to be filtered. In this example the substance 31 is ground coffee. A strength control system 20, comprising an automatic adjustment unit 22 is provided to exert an adjusting force, schematically indicated by arrow 21, to the lever 5. The force 21 is responsive to the level 23 of the water 30 in the water reservoir 2 and to a rotation position 5a of the lever 5. An end portion of the lever 5 is rotatably connected to the housing 1 in a first pivot 7. The filter holder 4 is rotatably suspended from the lever 5 in a second pivot 8. A float 6 is pivotally attached to the lever 5 in a third pivot 9. The float 6 is responsive to the level 23 of the water 30 in the water reservoir 2. The strength control system 20 detects the level 23 of the water 30 in the water reservoir 2 and the rotation position 5a of the lever 5. As will be explained later, the strength control system 20 determines the adjusting force 21 exerted on the lever 5, according to the detected water level 23 and the rotation position 5a of the lever 5. The adjusting force 21 exerts a torque on the lever 5. The lever 5 starts to rotate as a result. A pointer 10 is attached to the lever 5. The pointer 10 moves according to the rotation of the lever 5. A strength indicating scale 11 is attached to the housing 1. The position of the pointer 10 relative to the strength indicating scale 11 can be adjusted by pouring additional substance to be filtered into the filter holder 4. A leverage ratio is defined by the ratio of the distance between the first pivot 7 and the second pivot 8 and the distance between the first pivot 7 and the third pivot 9. The lever mechanism and the leverage ratio have been proportioned such that in the position where the pointer 10 is opposite to a reference mark 12 on the strength indicating scale 11, a constant ratio is obtained between the quantity of water 30 in the water reservoir 2 and the quantity of substance 31 to be filtered in the filter holder 4. If the pointer 10 is opposite to the reference mark 12 on the strength indicating scale 11, the strength control system 20 establishes the adjusting force 21 to the lever 5, such that the adjusting force 21 has zero magnitude.

If more substance is added to the filter holder 4 to obtain a stronger brew, the lever 5 will rotate in an anti-clockwise direction. The rotation position 5a of the lever 5 is detected by the strength control system 20. As a result of the anti-clockwise rotation position 5a of the lever 5, the float is further immersed into the water. The original water level 23 and an additional increase 24 of the level are detected by the strength control system 20. According to the rotation of the lever 5 and a new water level (23+24), being the sum of the original level 23 and the level increase 24, the strength control system 20 determines the aforementioned adjusting force 21 exerted on the lever 5. The adjusting force 21 will increase with increasing new water level, so that the perceived strength of the brew stays independent of the quantity of water in the water reservoir 2. As a result, the rotation of the lever 5 will be changed and the pointer 10 will indicate a new value on the strength indicating scale 11 to represent the strength of the brew that will be obtained. The leverage ratio is fixed and the only action required from the user is to pour the substance to be filtered into the filter holder 4 until the pointer 10 is at a desired position on the strength indicating scale 11. The perceived strength of the brew remains independent of the quantity of water in the reservoir 2 even when the pointer 10 is not opposite to the reference mark 12 on the strength indicating scale. Dosing of substance to the desired and reproducible strength, the strength being independent of the water quantity, is possible without manual adjustment and with only a single glance at the strength indication scale.

The strength control system 20 can be embodied in various ways. An advantageous way to control the strength of the brew is by measuring the water level 23 and the rotation position 5a of the lever 5 via an electrical device, known per se. The obtained signals can be fed into a processing unit, known per se. The processing unit determines an input signal to an electrical actuator to exert the adjusting force 21 for acting on the lever 5. The elaboration of these electrical technical features may be according to conventional methods. Another advantageous way to control the strength is provided by mechanical devices, as explained hereafter.

As stated above, the desired quantity ratio between the quantity of water in the water reservoir and the quantity of substance to be filtered is controlled. Thereto, the force 21 established by the strength control unit 20, should be zero when the pointer 10 is opposite to the reference mark 12 on the strength indicating scale 11. When the pointer 10 is not in its reference position opposite to the reference mark 12, the adjustment unit 22 generates the force 21, having a magnitude proportional to the quantity of the water 30 in the water reservoir 2.

Figure 2:
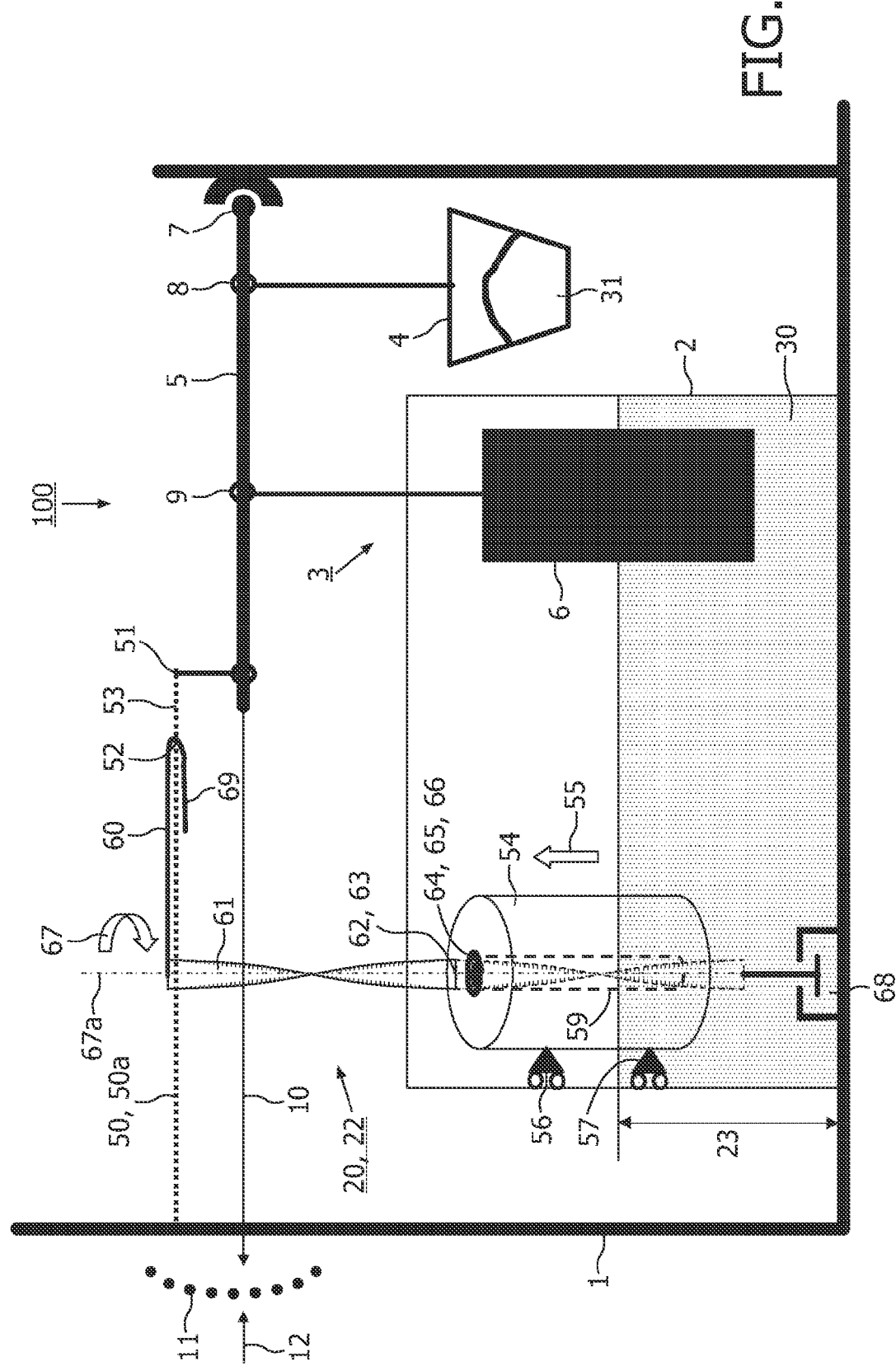
FIG. 2 is a schematic representation of another embodiment of the appliance according to the invention.

A variant of the embodiment disclosed in FIG. 1 is schematically depicted in FIG. 2. The same reference signs are used for those components that are similar to the corresponding component in the embodiment of FIG. 1. A strength control unit 20 comprises a resilient element 50a. Several types of resilient elements may be used, e.g. a helical spring, a torsion spring, or the like, but a leaf spring is preferred. In the embodiment of FIG. 2 a leaf spring 50 is mounted. A first part 51 of the leaf spring 50 is connected to a portion of a lever 5. A second part 52 of the leaf spring 50 is restricted at a position responsive to a quantity of water 30 in a reservoir 2. Between the first part 51 and the second part 52 the leaf spring 50 comprises a loadable portion 53. An adjusting portion 60 of a length control unit 61 can be used to adjust the length of the loadable portion 53. The restriction position and the length of the loadable portion 53 are responsive to a level 23 of the water 30 in the water reservoir 2. The leaf spring 50 is a resilient part, i.e. capable of returning to its original shape. The strength control unit 20 is mounted to an appliance 100 such, that the leaf spring 50 assumes its original shape when a pointer 10 is opposite to a reference mark 12 on a strength indicating scale 11. In this position the leaf spring 50 exerts a force of zero magnitude to the lever 5. An automatic adjustment unit 22 comprises a floatable body 54, whose position is responsive to the level 23 of the water 30 in the reservoir 2. If the level 23 increases, the floatable body translates over a translation 55 indicated by an arrow. A kinematical restriction, comprising restriction elements 56, 57 and 58 (not visible in FIG. 2 but in FIG. 3), is provided to enable translation 55 and to prevent a rotation of the floatable body 54. In the embodiment of FIG. 2 the floatable body 54 comprises a bore 59. The bore 59 accommodates a guided portion 62 of the length control unit 61. The guided portion 62 of the length control unit 61 comprises a first guide face 63 of a twisted shape. The floatable body 54 comprises a second guide face 64, provided in the bore 59. The second guide face 64 is provided by e.g. a slotted opening 65 in a disc 66, fitted into the bore 59. The translation 55 of the floatable body 54 transmits the increase of the water level 23 into a rotation 67 of the guided portion 62 of the length control unit 61. The guided portion 62 is rotatably connected to the water reservoir 2 by a pivot 68. The pivot 68 prevents translation of the guided portion 62. The guided portion 62 is rigidly connected to the adjusting portion 60 of the length control unit 61. The guided portion 62 has a length axis 67a. The rotation of the guided portion 62 causes the rotation 67 of the adjusting portion 60 of length control unit 61. Said rotation 67 is around the length axis 67a. The adjusting portion 60 comprises a bended portion 69 enclosing the leaf spring 50 and restricting the leaf spring 50 in its second part 52 from movement along the direction of translation 55. The adjustment of the length of the loadable portion 53 of the leaf spring 50 will vary as a result of the rotation 67 of the length control unit 61 as elucidated by FIG. 3.

In the embodiment of FIG. 2, the guided portion 62 of the length control unit 61 is of a twisted shape to transmit the translation 55 of the floatable body 54 into rotation 67 of the length control unit 61. Thereto, the floatable body 54 is prevented to rotate by restrictions 56, 57 and 58. Alternatively, it is possible to use a guided portion 62 of a straight shape and to prescribe a rotation of the floatable body as a kinematical inversion of the embodiment of FIG. 2 by means known per se.

Figure 3:
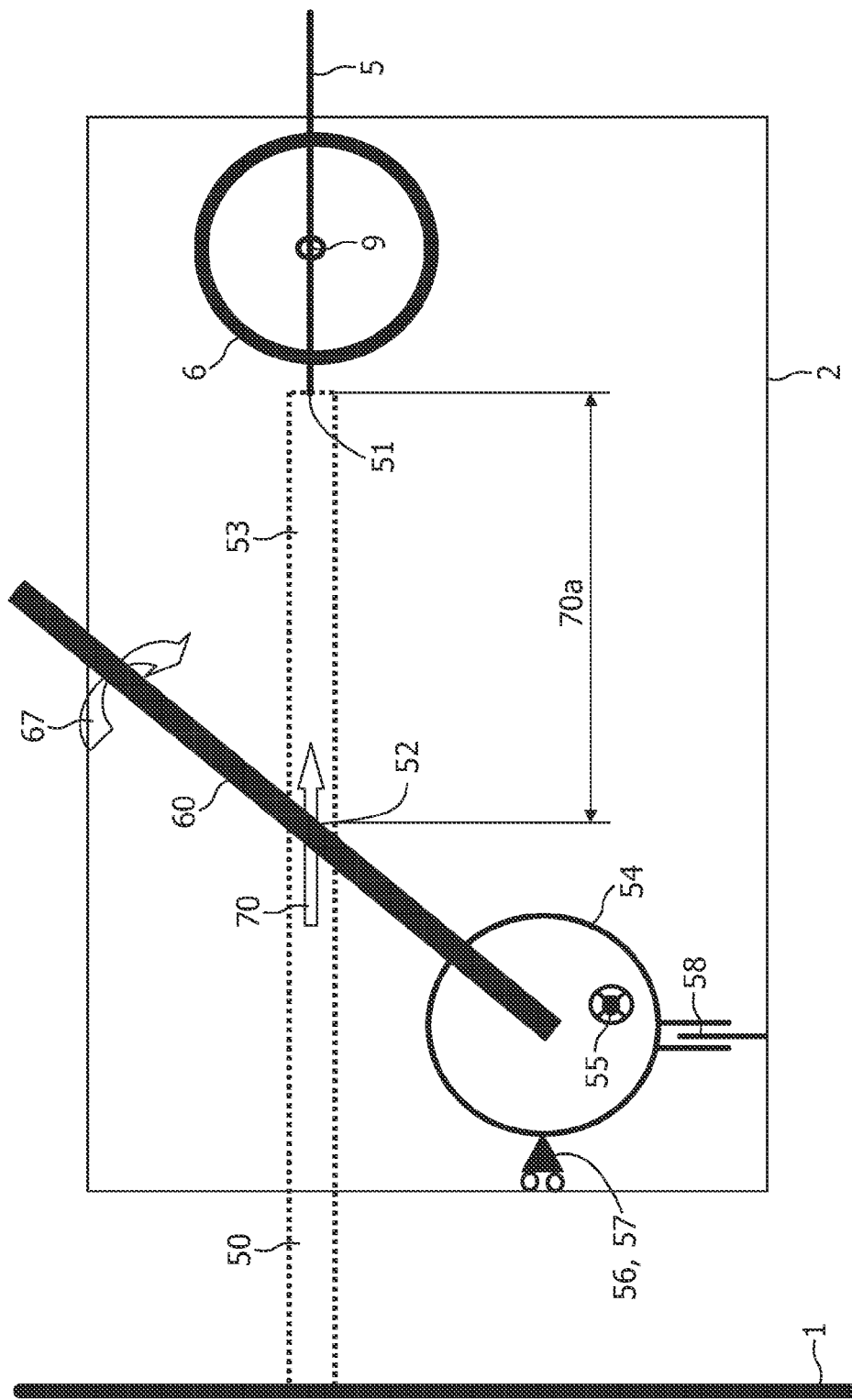
FIG. 3 is a top view of the embodiment of FIG. 2.

In FIG. 3 a top view of the embodiment described above according to FIG. 2 is schematically depicted. The floatable body 54 is restricted to rotate by restrictions 56 to 58. The translation 55 of the floatable body 54 is according to the change of the quantity of the water in the reservoir 2. As a result of the translation 55 of the floatable body 54, the adjusting portion 60 is rotated by rotation 67. The rotation 67 causes a translation indicated by an arrow 70 of the restriction of the leaf spring. A loadable length 70a of the leaf spring 50 is adjusted accordingly. The direction of the twisted shape in the guided portion 62 (see FIG. 2) of the length control unit 61 (see FIG. 2) is such that the loadable length 70a decreases at increasing water level 23 (see FIG. 2). The spring stiffness of the leaf spring 50 increases if its loadable length 70a decreases according to generally known theories in the field of mechanical engineering. The twist of the guided portion 62 (see FIG. 2) is designed such, that the progressiveness of the stiffness of the leaf spring is in accordance with the desired quantity ratio between substance to be filtered and water in the reservoir.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. Devices, elements and components, known per se, have not been described in detail, as the skilled person is familiar with the matter. In the claims, the word "comprising" does not exclude other elements or steps, and the indefinite article "a" or "an" does not exclude a plurality. A single mechanism or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. An appliance for making beverages including coffee, tea and the like, said appliance comprising a housing for a water reservoir, a filtering device including a filter holder and a lever supported by the housing and supporting the filter holder, and a strength control system for obtaining and indicating a desired quantity ratio between a quantity of water in the water reservoir and a quantity of substance, to be filtered, in the filter holder and for exerting a force on the lever, the strength control system comprising an automatic adjustment unit for adjusting the desired quantity ratio between the quantity of water in the water reservoir and the quantity of substance in the filter holder, said automatic adjustment unit comprising a resilient element having a first part connected to a portion of the lever and being restricted in a second part at a restriction position responsive to the quantity of water in the reservoir.

2. An appliance according to claim 1, where the automatic adjustment unit includes a length control unit and the resilient element comprises a leaf spring having a loadable portion of adjustable length, said length being adjustable by an adjusting portion of the length control unit.

3. An appliance according to claim 2, where the automatic adjustment unit comprises a floatable body for cooperation with a guided portion of the length control unit, the guided portion being coupled to the adjusting portion of the length control unit and the floatable body having a position responsive to the quantity of water in the reservoir.

4. An appliance according to claim 3, where the guided portion has a first guide face and the floatable body has a second guide face corresponding to and cooperating with the first guide face for slideable engagement of the floatable body with the guided portion.

5. An appliance for making beverages including coffee, tea and the like; said appliance comprising a housing for a liquid reservoir, a filtering device including a filter holder and a lever moveably supported by the housing, and a strength control system for obtaining a desired quantity ratio between a quantity of water in the liquid reservoir and a quantity of a substance to be filtered in the filter holder;
said lever being movable between a first position indicative of a higher substance-to-water quantity ratio and a second position indicative of a lower substance-to-water quantity ratio;
said filter holder being coupled to the lever to provide a first force urging said lever toward the first position in response to a quantity of the substance in said filter holder;
a float coupled to the lever to provide a second force urging said lever toward the second position in response to the level of water in the liquid reservoir; and
an automatic adjustment unit coupled to the lever for effecting an accurate indication of the strength of the beverage that will be produced for the quantities of substance in the filter and water in the reservoir, said unit responding to the position of the lever and the quantity of water in the reservoir by:
applying a zero magnitude force to the lever when the lever is in a reference position between the first and second positions, indicating that said quantities will produce a beverage of the reference strength;
applying an adjusting force urging the lever in the first direction when a quantity of the substance is added to the filter holder resulting in a deeper immersion of the float in the water, said adjusting force compensating for an increase in the second force resulting from an increase in the water level caused by said deeper immersion of said float.

6. An appliance according to claim 5 including a strength indicating scale for indicating the strength of the beverage.

* * * * *